Nov. 28, 1961   D. W. RANDOLPH   3,010,602
IMPREGNATED GLASS FIBER TANKS
Filed Dec. 20, 1957                            5 Sheets-Sheet 3
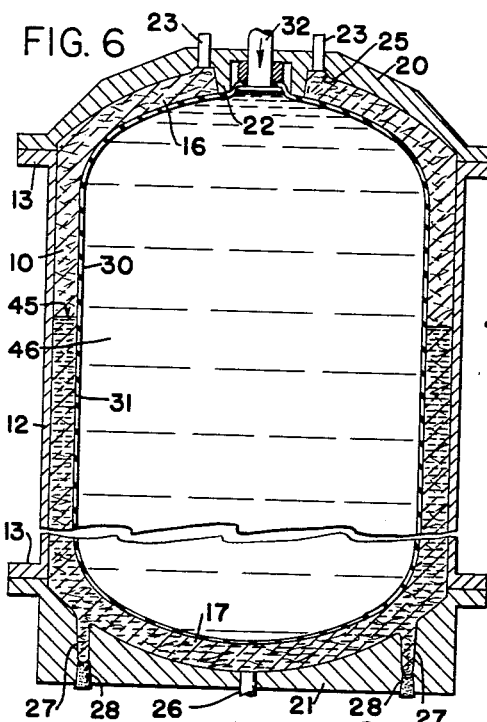
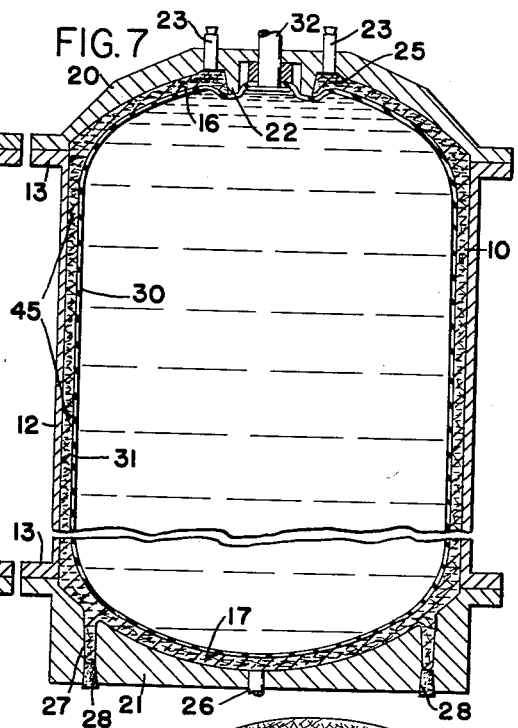
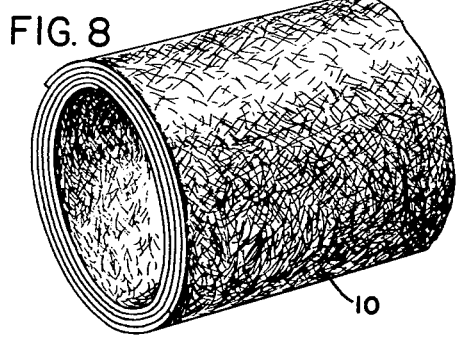
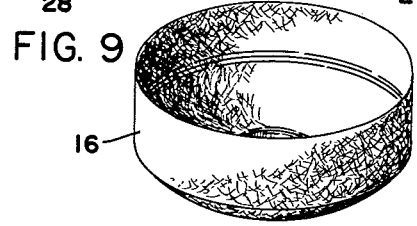
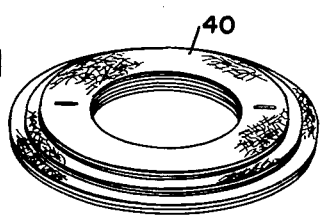
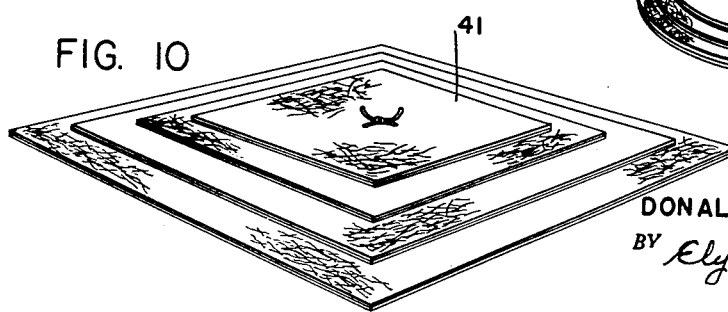
*INVENTOR.*
DONALD W. RANDOLPH
BY *Ely, Pearne & Gordon*
ATTORNEYS Nov. 28, 1961    D. W. RANDOLPH    3,010,602
IMPREGNATED GLASS FIBER TANKS
Filed Dec. 20, 1957    5 Sheets-Sheet 4

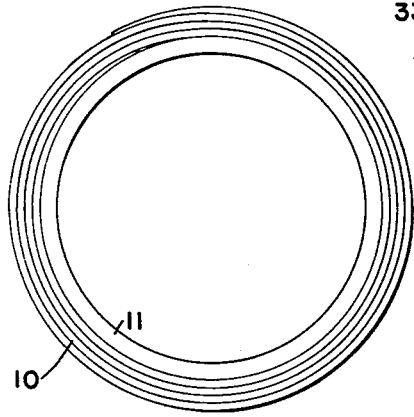
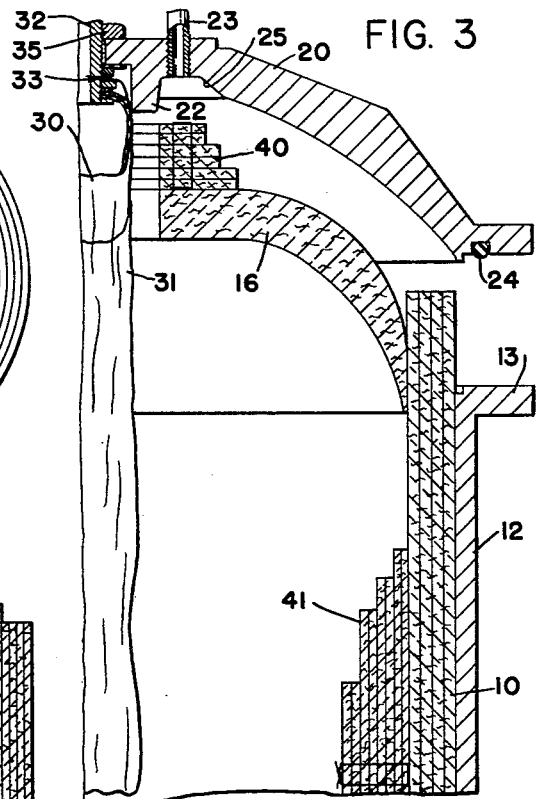
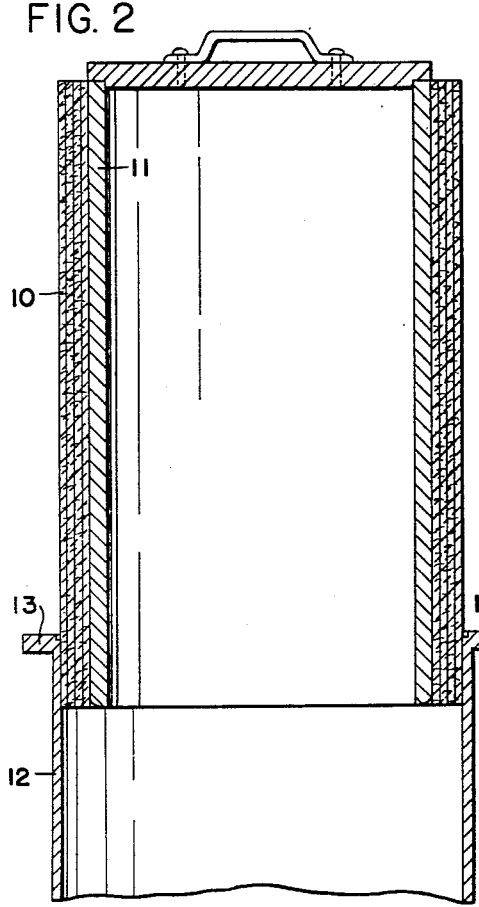
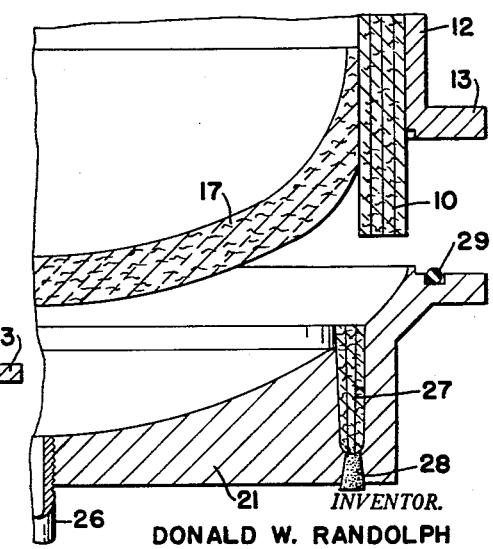

INVENTOR.
DONALD W. RANDOLPH
BY *Ely, Pearne + Gordon*
ATTORNEYS

*INVENTOR.*
DONALD W. RANDOLPH
BY

ATTORNEYS

3,010,602
IMPREGNATED GLASS FIBER TANKS

Donald W. Randolph, Gate Mills, Ohio, assignor to Structural Fibers, Inc., Chardon, Ohio, a corporation of Ohio
Filed Dec. 20, 1957, Ser. No. 704,028
7 Claims. (Cl. 220—83)

This invention relates to fiber-reinforced molded articles, and it pertains more particularly to hollow containers or tanks which are fabricated by laying up unwoven fiber mats approximately in the shape of the container or tank to be produced and impregnating them with a liquid which is subject to curing or setting by application of a setting agent, such as heat, whereby a substantially homogeneous, seamless hollow structure is achieved.

This application discloses and claims material divided out of a copending parent application Serial No. 577,487, filed April 11, 1956, and now Patent No. 2,977,268 in which methods of making such tanks are claimed. This application also discloses and claims certain additional material and, therefore, may be denominated continuation-in-part of the parent application.

During recent years the manufacture of fiber-reinforced molded articles has been considerably stimulated because the balance between material costs and fabricating costs, on the one hand, and utility, strength, and durability, on the other hand, has compared favorably with similar balances made in connection with older and more conventional methods and products.

One of the applications in which fiber-reinforced molded articles have long shown promise is in the manufacture of domestic water softener tanks and similar large, water-tight, and chemically resistant, hollow objects. However, progress in this particular field has been limited because of high costs and other disadvantages inherent in the fabrication of several subassemblies prior to final assembly and fabrication of the completed product. Attempts to form a large, integral, one-piece, hollow unit in a single pressure molding or forming operation have not been successful due to the fugitive nature of fiber matting when it is confined and compressed between narrowly spaced walls between which conventional settable liquid resins are forced under pressure. For example, when fiber matting is layed up in the approximate form of the desired object and encased in an external rigid mold, between the mold walls and an expanding fluid-filled bag or envelope for applying the desired pressure to shape the matting, and thereupon an impregnating liquid is forced through the matting to permeate it, the liquid acts as a lubricant and the fibers tend to flow with the liquid, destroying the conformation of the layed-up matting. Permeation of the fiber matting by the impregnating liquid has also been accompanied by the entrapment of pockets of air within the interlaced fiber matting, resulting in the formation of voids in the final product. Such voids very seriously weaken the walls of the final product and render it useless.

According to the methods described herein, one-piece fiber-reinforced hollow tanks may be successfully and economically pressure molded. Articles made according to the present invention are reinforced throughout with substantially evenly distributed matted fibers, in a manner to be described below. The entrapment of air and the formation of voids are eliminated. Wall thickness of the final product may be made substantially uniform. All portions of the final product are cast in one integral piece, including the end walls and a foot structure for supporting the product in use.

The method described herein contemplates partially permeating the walls of a hollow form of layed-up fiber matting with a thermosetting resin or the like while the matting is under only slight pressure, and then progressively compressing the walls in such a manner as to distribute the resin throughout the matting and achieve the desired effects of pressure molding, while at the same time avoiding migration of the fibers and destruction of the layed-up fiber mats. This method reduces the cost of manufacturing large, fiber-reinforced, hollow tanks and similar objects, and such tanks are produced which are more useful and durable than those of the prior art.

The invention to which the present divisional application is directed is the product, in the form of a tank, disclosed in the above mentioned parent application in the course of disclosing preferred methods for producing it.

The objects of the present invention are to avoid discontinuities in the fiber reinforcement of the tank structure so as to provide a substantially uniform distribution of interlocked or intermingled fibers therethrough; to avoid air bubbles or pockets and similar discontinuties in the resin in which the reinforcing fibers are embedded so as to provide a reinforced resin mass of maximum strength and minimum porosity; to provide a high density of interlocked fiber reinforcement throughout the tank body; to provide thickened tank wall portions, about openings in a tank wall, which are so designed as to minimize the natural tendency of such thickened portions to concentrate stresses about their peripheries in the tank wall and thereby weaken the tank in that region; to provide increased resistance of fiber reinforced tanks to the attack of chemicals and the deteriorating effects of hot water and steam; and to provide a foot structure capable of being formed integrally with the tank, for supporting the same in use, without weakening the tank structure or causing complications in its fabrication by the methods of said parent application.

In general, the preferred tank structures of the present invention are elongated cylinders having outwardly convex end walls, at least one of the end walls having a central opening therein for communication with the interior of the tank. In many embodiments of the invention, at least one additional opening is provided at any desired location in the cylindrical side wall of the tank, the side wall being thickened about the periphery of the additional opening to provide reinforcement in this region and to provide an adequate length of opening for tapping to receive a connecting threaded conduit, and the thickened portion gradually decreasing in thickness radially outwardly from the opening therein so as to merge gradually with the surrounding side wall. In some embodiments of the invention, the fiber reinforcement at the inner surface of the tank is composed of a material selected to provide maximum resistance of the tank to chemical attack and/or to the deteriorating action of hot water and steam, whereas the fiber reinforcement throughout the balance of the tank body is of a different material selected to give maximum strength for a given quantity or cost of fibrous material.

These and other objects, features, and advantages of the invention will become apparent from the following description of the invention, given by way of example.

In the accompanying drawings which supplement the description:

FIGURE 1 illustrates, somewhat schematically, an initial or preparatory step in the manufacture of fiber-reinforced hollow tanks according to the herein described example of the invention.

FIGURE 2 illustrates the insertion of a roll of fiber matting into a cylindrical mold section in a manner consistent with the practice of the herein described example of the invention.

FIGURE 3 is a view in cross-section of the top right-hand portion of molding apparatus for producing the tanks of the invention, the mold sections being parted and fiber forms being inserted into place to be subsequently impregnated and molded according to the invention.

FIGURE 4 is a view similar to FIGURE 3, showing the lower right-hand portion of apparatus for producing the tanks of the invention.

FIGURE 6 is a view similar to FIGURE 5 but more schematic in nature showig apparatus for producing the tanks of the invention just following introduction of resin into the mold.

FIGURE 7 is a view similar to FIGURE 6 showing apparatus for producing the tanks of the invention, following the step of compressing the fiber walls which have been laid up within the molding chamber and which have been impregnated with resin.

FIGURE 8 is a perspective drawing of a cylinder of fiber matting which may be employed in the invention.

FIGURE 9 is a drawing of a fiber end cap which may be employed in the invention.

FIGURES 10 and 11 are drawings of additional fiber form which may be employed in the practice of the invention.

Figure 12:
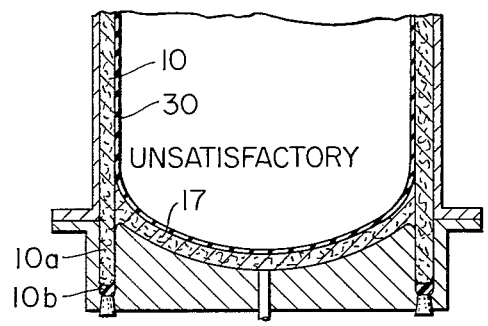
Figure 13:
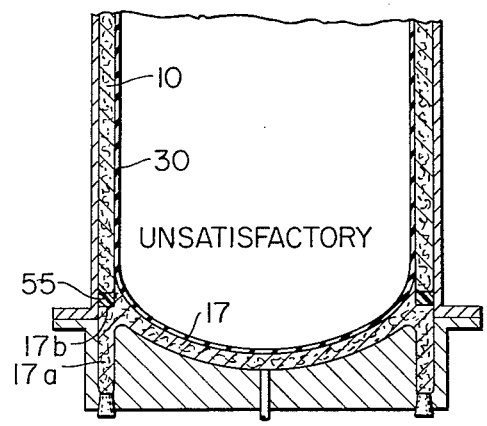

FIGURES 12 and 13 are fragmentary cross-sectional views of two forms of molding apparatus and resulting tank structures which result in unsatisfactory tanks subject to failures in the region of the foot structure or the region of juncture of the foot structure and the tank body, these being supplied herein as an aid in explaining problems of tank design and fabrication which are inherent in the illustrated apparatus and product but which are overcome by the invention.

Figure 14:
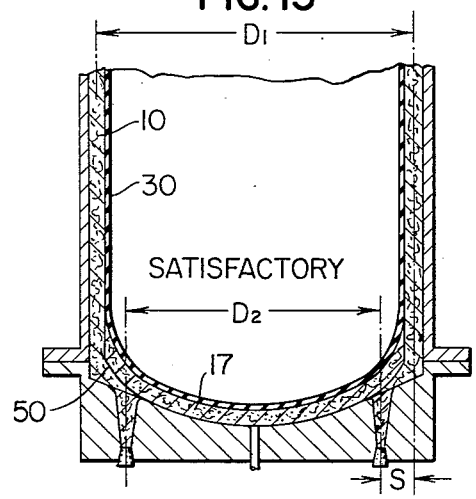

FIGURE 14 is a fragmentary cross-sectional view of a preferred form of molding apparatus and resulting tank structure which produce satisfactory tanks and, more particularly, which overcome the tank design and fabrication problems illustrated in FIGURES 12 and 13.

Figure 15:
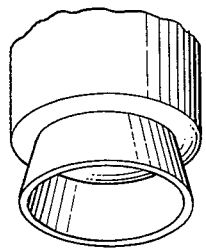

FIGURE 15 is a persepctive view of the lower end of a tank having an optional, modified foot structure comprising a unitary, frusto-conical foot.

Figure 16:
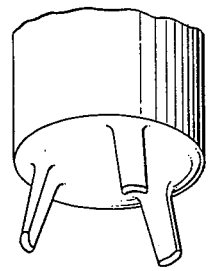

FIGURE 16 is a similar perspective view of the lower end of a tank having another optional, modified foot structure comprising three separate feet.

Figure 17:
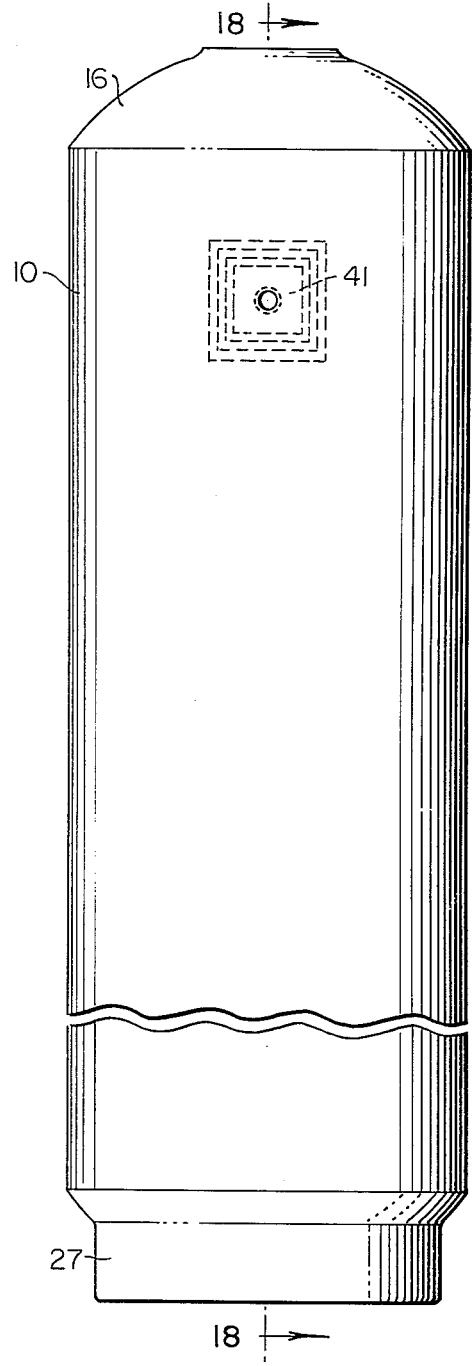

FIGURE 17 is an elevational view of the completed tank.

Figure 18:
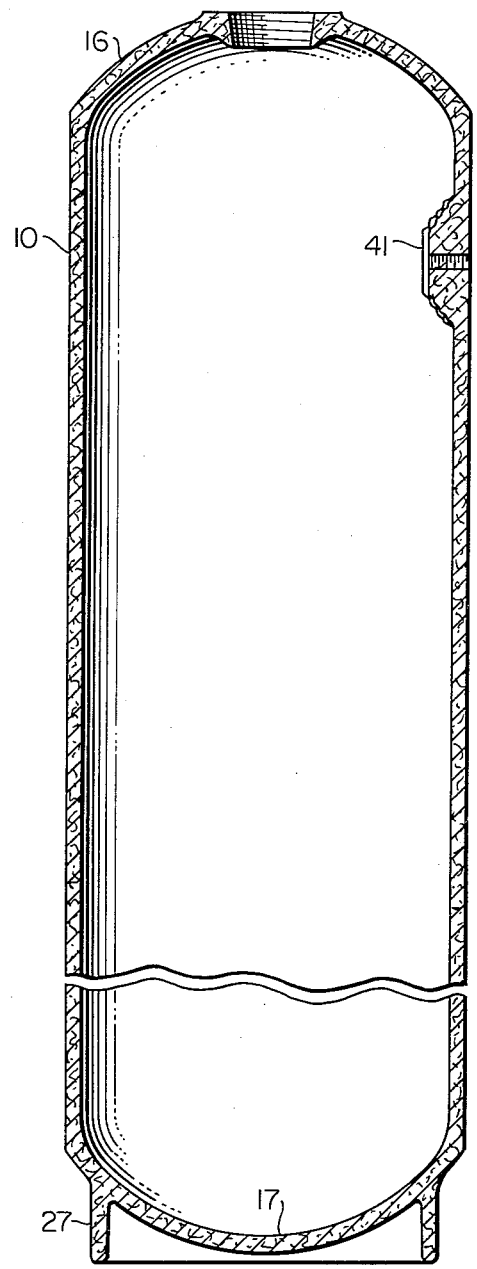

FIGURE 18 is a cross-sectional view of the tank taken along line 18—18 of FIGURE 17.

The invention employs reinforcing fibers, such as glass fiber or equivalent material. A loose mat of suitable fiber, such as the fiber matting 10, is convolutely wound on a form or core 11 and is inserted in a cylindrical mold casing 12 as indicated in FIGURES 1 and 2. The form or core 11 is then withdrawn to leave the mold casing 12 lined with the convolutely wound fiber matting 10. The cylindrical mold casing 12 is provided with end flanges 13 which are adapted to close against cooperating flanges on other mold sections to be described below.

There are also provided fiber matting pieces in the shape of caps 16 and 17 which may be identical except that the upper cap 16 has a central hole formed therein. The cap 16 is shown in inverted position in FIGURE 9. The caps 16 and 17 may be shaped by conventional means which will be known to those familiar with the fabrication of fiber-reinforced molded articles. For example, fibers may be blown over cup-shaped screens to form a cup-shaped mat, and a light resin adhesive may be sprayed on the fibers as they accumulate on the screen to hold the fiber mat together during subsequent handling.

The outer diameter of the caps 16 and 17 may be equal to the internal diameter of the convoluted mat 10 when it is positioned within the casing 12.

Upper and lower casing caps 20 and 21 are provided. Suitable flanges on these caps are adapted to close against the end flanges 13 of the cylindrical mold casing 12. The internal surfaces of the casing caps are in the shape of oblate ellipsoids of revolution or they may be hemispherical. They may also have other shapes which, however, will be less adaptable to the production of a strong tank structure. This is important inasmuch as applications to which the invention relates must usually be capable of withstanding pressures of as much as 500 p.s.i. The inner surface of the upper casing cap 20 is centrally relieved as at 25 and is provided with a central annular rib 22 and with vent sleeves or passages 23. The flange of the upper casing cap is provided with a suitable sealing ring 24. The lower casing cap 21 is provided with a central resin supply line 26. A deep annular groove 27 is formed around the lower casing cap. A plurality of drains or sprues 28 open downwardly from the bottom of the annular groove 27. The flange associated with the lower casing cap is provided with a suitable sealing ring 29.

A flexible envelope is provided for expansion against the fiber lining. An orifice structure associated with this envelope is adapted to be inserted upwardly through the central opening in the upper fiber cap 16 and through a central opening in the casing cap 20, radially inwardly of the annular rib 22. The flexible envelope may comprise a rubber bag 30 encased in a protective sheath of polyvinyl acetate film or cellophane film or similar material which will protect the molding materials against chemical action of vulcanizing agents or residues thereof associated with the bag 30. The bag 30 and protective sheath 31 are supported on a flanged and threaded neck 32 and are sealed thereto by suitable washers and gaskets 33 which are clamped by tightening of nut 35 threadedly engaged on the outer end of the neck 32. When filled but not dilated the bag preferably has a volume approximately equal to the difference between the volume of the chamber defined by the casing members 12, 20 and 21 and the volume occupied by the mats 10, 16 and 17.

There are also provided round rings of fiber matting 40 of progressively varying sizes, which may be stitched together for convenience in handling, as shown in FIGURE 11. There are also provided squares of fiber matting 41 of progressively varying sizes, also stitched together, as shown in FIGURE 10.

Figure 5:
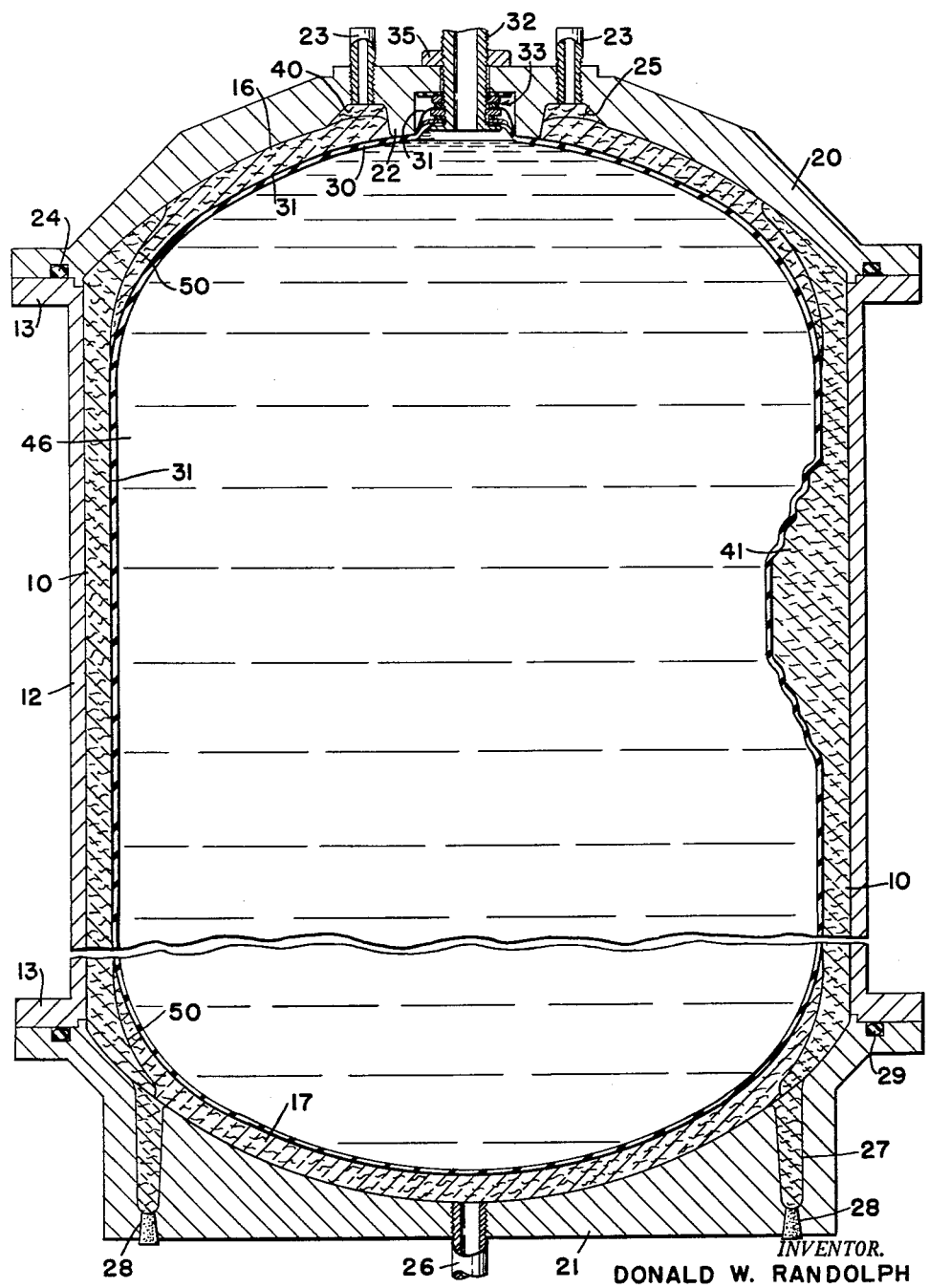
FIGURE 5 is a cross-sectional view showing molding apparatus for producing the tanks of the invention with all mold sections closed and with a central expanding envelope almost fully expanded but with no resin as yet introduced into the mold.

Prior to the molding operation, the convolutely wound fiber matting 10 is inserted in the cylindrical casing 12 as above described, and pairs of groups of square matting 41 are tacked to one side of the convolutely wound matting 10 at the top and bottom thereof. The upper group of tacked-on squares is indicated in FIGURES 3 and 5. The purpose of these pads is to provide added thickness in the side wall of the tank at points where pipe connections are to be made. The size and shape of these added mats may also be made so as to reinforce the tank to withstand high external pressure. In this case the pad may take the form of a complete ring around the inner circumference of the tank.

The fiber caps 16 and 17 are telescoped within the ends of the convolutely wound matting as indicated in FIGURES 3 and 4. A group of rings 40 is tacked around the central opening of the upper fiber cap 16 as indicated in FIGURE 3. The annular grove 27 in the lower casing cap 21 is stuffed with fiber as indicated in FIGURE 4.

The casing members are closed together and the flexible envelope comprising the rubber bag 30 is filled with liquid, so that the weight of the incompressible liquid will hold the outer surface of the flexible envelope in contact with substantially the entire surface of the fiber matting lying within the molding chamber. Alernatively, in accordance with an invention of Charles M. Nerwick disclosed in his concurrently filed application, Serial No. 745,093, and now Patent No. 2,977,269 for Methods of of Making Hollow Articles, air or other gas pressure may be used, instead of liquid pressure, within the bag 30 without in any respect departing from the product invention of this application. The bag initially exerts only a light pressure to moderately compress the fiber matting or lining. The pressure head due to the weight of a body of liquid in the rubber bag causes somewhat greater compression of the fiber lining adjacent the bottom of the molding chamber, which, throughout the molding operation, is maintained more nearly vertical than horizontal and preferably in a substantially upright position. A measured amount of resin 45 is then introduced through the supply line 26. The amount of resin introduced is such that the charge will permeate the entire fiber lining during a subsequent compressing operation. Preferably, a slight excess of resin is provided. The resin comprises any suitable thermosetting resin adapted to be set at temperatures above room temperature. It is preferred that a resin be employed that will set at about 200–220° F. Resins adaptable to the purposes herein described will be well known to the art, and in general, high-temperature-resistant thermosetting resins of the type usually known as polyester resins, such as epoxy resins or styrenephthalic anhydride condensation products may be employed together with suitable setting agents adapted to control setting temperature, all as is well known in the art.

As the resin is introduced into the bottom of the molding chamber and rises around the bag 30, it forces air within the fiber matting out through the upper vents 23. The rising column of resin displaces the air, but at no time is the fiber lining wetted with resin ahead of the path of escaping air. The incompressible liquid within the bag 30 prevents billowing of the bag at the lower corners thereof or elsewhere and thereby prevents the fibers from migrating upwardly with the rising resin by maintaining firm contact of the envelope with the matting over the entire inner surface of the fiber lining.

Additional pressure is now applied by slowly feeding additional liquid 46 into the flexible envelope comprising the bag 30 to cause substantial compression of the fiber lining within the molding chamber. For example, a ½ inch fiber wall may be compressed to a final thickness of approximately 5/16 inch. The liquid 46 within the bag 30 is a suitable non-compressible liquid such as water. Due to the weight of the incompressible liquid within the bag 30, at each given height a given compressing pressure is attained at a later time than the same pressure is attained at lower heights, although the pressure differential between different heights is relatively small. Due to the resultant diminution of the volume of the fiber lining, the resin 45 is expressed upwardly throughout the entire fiber lining. There is preferably a slight excess of resin which is expressed outwardly through the upper vents 23, thus signalling that impregnation of the entire fiber lining is complete. Permeation of the fiber lining at upper portions thereof may occur in large part while the fiber is still relatively loosely packed.

In some applications the above forming steps may be sufficient; however, in most applications it is preferred to complete final compression by removing plugs or caps from the drains or sprues 28, which had heretofore been closed, and thereupon slowly injecting additional liquid into the bag to apply an additional and ultimate compressing pressure to the liquid within the bag 30 to express additional exess resin both from the vents 23 and through the drains or sprues 28. This ultimate pressure is selected to produce the desired final wall thickness and desired final compaction of the fibers.

After the fiber body of the article has been thus impregnated and shaped within the mold, the casing of the mold is subjected to heat in order to set the resin. Heating elements or heating coils (not shown) of conventional structure are provided adjacent the mold casing members preferably in such a manner that uniform heating over all mold surfaces is achieved, in as great measure as possible, in a manner which will be familiar to those skilled in the art. Preferably, during heating of the mold and setting of the resin, the various vents 23 and drains or sprues 28 are plugged or capped. After setting of the resin, the mold is inverted and the bag 30 is drained, collapsed and withdrawn through the mouth of the formed article, the casing cap 20 being released from the casing 12 during this operation. The built-up or reinforced sections formed by the groups of squares 41 are than centrally drilled to provide inlet and outlet ports for the final product, which openings may be threaded to receive connecting pipes.

The casing cap 21 is also removed from the casing 12 and the nut 35 is turned off and the bag 30 is released from the casing cap 20 prior to emplacement of new fiber mats incident to a succeeding molding operation.

It will be noted that the initial seams 50 between the fiber caps and the cylindrical fiber wall extend as taperedlap seams across the corners or junctures between the end cap portions of the final product and the cylindrical sidewall portions of the final product, and that these seams are permeated by a homogeneous body of set resin to form an overall integral body. The matted fiber elements initially brought together on opposite sides of these seams have numerous outwardly projecting ends, and compression of the fiber body while impregnated with liquid resin causes considerable migration of the individual fibers throughout the fiber body. As a result, the finally set body is substantially homogeneous, and, as a general rule, virtually no trace of the lap seams is detectable in cross-sections cut through these regions of the final product.

It is preferred that, during the final compressing operation, the water or other liquid forced into the bag 30 be supplied at a slow and constantly diminishing rat by maintaining a constant air pressure on a reserve supply of the liquid in a reservoir with which the inlet neck 32 communicates. A suitable adjustable air pressure regulator of a conventional type may be provided to closely control the air pressure in the reservoir and thus furnish close control of the rate of feed of liquid into the bag 30. The air pressure is preferably maintained constant during the compressing step, so that the rate of flow of compressing liquid into the bag 30 becomes slower and slower as maximum compressing pressure is approached. In those cases where final compression is completed by opening the drains or sprues 28 and injecting additional liquid into the bag 30 to apply an additional and ultimate compressing pressure, as mentioned above, the air pressure in the reservoir may be adjusted upwardly for this final compressing step by changing the setting of the air pressure regulator to a higher constant setting, so that the rate of flow of the additional liquid into the bag 30 also becomes slower and slower as ultimate compressing pressure is approached. In a typical application, ultimate compressing pressure in the bag 30 might be in the order of 25 or 30 p.s.i., although higher or lower pressures may be desired in different jobs. A pressure gage may be provided in the line which connects the inlet neck 32 to the reservoir.

When producing tanks in accordance with the procedures described herein and utilizing a final pressure in the bag 30 of 25 to 30 p.s.i., while the plugs 28 are removed and the passages 23 are also open, both before and during the setting of the impregnating liquid, substantial compression of the original fiber matting and discharge of excess resin occur. By reason of the lubrication of the loose fibers by the liquid impregnating resin while this pressure exists, the compaction of the fibers and discharge of excess resin are greatly facilitated, and a fiber content in excess of 40% by weight of the final tank body inherently results. By the process disclosed, fiber contents in excess of 60% by weight may readily be achieved. By contrast, when fiber mats are impregnated with resin and spun centrifugally in accordance with a conventional process for producing long tubular articles, it is virtually impossible to obtain fiber contents as high as 40% by weight and the fibers are inherently compacted to a lesser degree adjacent the inner surface of the tubular article than adjacent the outer surface thereof. Thus, by centrifugal casting of tubular articles, the optimum concentration of fibers for maximum strength cannot be achieved throughout the wall thickness of the articles. Therefore, the substantially uniform high fiber content of the tanks produced throughout the tank structure in accordance with the present invention is believed to be an important, novel feature of the invention which has not been attainable in practice when using prior fabricating techniques.

FIGURES 6 and 7 are intended to illustrate, somewhat schematically, certain steps in the manufacture of articles according to the invention. FIGURE 6 shows apparatus employed in the invention prior to the final compressing or forming step. The fiber lining is moderately compressed, and the level of the resin 45 may be slightly above the half-way height of the molding chamber at the conclusion of feed, as shown. FIGURE 7 shows the same apparatus and fully impregnated lining subsequent to the final compressing or forming step and just prior to the step of heat setting the formed article.

The various fiber mattings and caps will most advantageously comprise glass fiber, due to the high strength properties of these fibers. The service life of articles formed in accordance with the general objects of the present invention can be further improved by forming each of such mattings and caps with an inner layer or lining of other types of fibers, such as acrylic fibers, for example, a copolymer of vinyl chloride and acrylonitrile formed as relatively fine fibers. In practice, the cylindrical body of fiber matting 10 shown in FIGURES 1 and 2 may be made by first rolling one or more layers of fibers of one type on the core 11, followed by rolling one or more layers of fibers of another type.

For the same reasons that a substantially homogeneous structure results at seams between initially separate matted fiber elements adjacent the ends of the tank, the fibers at the contiguous surfaces of each winding merge or migrate into one another across the several winding interfaces. Thus, all of these interfaces virtually disappear in the final steps of the process and the transition from fibers of one type to fibers of the other type is a gradual one, no sudden change from fibers of one type to fibers of another being discernible and the fibers of the two types being intermingled in a transition zone. Similarly, in the fiber end caps 16 and 17 and the fiber mats or pads 40 and 41, the transition in the final product from one type of fiber to the other is a gradual transition. As a result, except for such a gradual transition in the chemical composition and physical properties of the fibers between the inner and outer surfaces of the finished product, the body of the tanks is not only seamless throughout but is substantially homogeneous throughout. In the appended claims, the terms seamless and homogeneous are used in this sense.

FIGURES 12, 13, and 14 illustrate how the integrally formed foot structure of the tanks, formed as described above, solved problems encountered with other foot designs, FIGURE 14 showing an important relationship between the diameter $D_1$ of the cylindrical fiber matting 10 of the tank side wall and the diameter $D_2$ of the circular zone at the bottom fiber cap 17 at which the foot structure is attached. Earlier attempts to provide an integrally formed foot structure involved extending the length of the cylindrical matting 10 beyond the bottom cap 17, as shown at 10a in FIGURE 12, to produce a cylindrical fiber structure which, when impregnated, would provide a suitable cylindrical foot of the same diameter as the cylindrical side wall of the tank. This proved to be unsatisfactory insofar as the foot structure is concerned because, during the step of increasing the pressure in the envelope 30 to express the impregnating resin upwardly to the top of the tank, the fibers in the cylindrical matting 10 and the extension 10a tended to creep upwardly, rather than downwardly against the bottom of the foot cavity in the mold as was expected. As a result, the lowermost portion of the foot, at 10b, was left with no fiber matting therein in the finished product, and cracking and breaking of this unreinforced portion of the foot was encountered with serious regularity. Although the resulting tank was satisfactory as a tank, machining off the defective bottom foot portion 10b was required. Obviously, this additional operation and waste material would be undesirable in commercial operations.

A second attempt to provide a satisfactory foot structure, with the former problem in mind, involved providing a cylindrical mass of fibers 17a on the preformed fiber cap 17, as shown in FIGURE 13. The cylindrical side wall matting 10 was positioned so that its lower end abutted a shoulder 17b provided by the upper end of the cylindrical fiber mass 17a. This solved the former problem in that a sound foot structure resulted, but it created an even more serious problem. The same tendency for the fiber matting 10 to creep upwardly, during the step of increasing the pressure in the envelope 30 to distribute the resin, left a zone 55 of unreinforced resin at the critical juncture between the cylindrical fiber matting 10 and the bottom cap 17. As a result, the finished tanks were too weak in this zone to withstand the required internal pressures without bursting, and the unreinforced resin in this zone had a serious tendency to crack and cause frequent leaking of the tanks at pressures far below those required to actually burst the tanks.

The final solution of both of these problems came from reducing the diameter $D_2$ of the circular zone of the bottom cap 17 at which the foot structure joined the tank. By selecting this diameter so that it was substantially less than the diameter $D_1$ of the cylindrical side wall of the tank, the fiber matting 10 of the side wall could be curved inwardly during the closing of the mold to provide a tapered-lap seam 50 at the periphery of the cap 17 in the finished tank, with the lap seam actually extending well around and radially inwardly from the lower periphery of the cylindrical side wall of the tank, as shown in FIGURE 14. This served to anchor the lower end of the fiber matting, so that its tendency to creep upwardly was greatly reduced, and virtually eliminated defects in the tank adjacent the bottom end wall thereof and defects in the foot structure itself.

Thus, characteristic features of the preferred form of tank in accordance with the present invention are that the tapered-lap seams 50 between the cylindrical side wall matting 10 and the end wall mattings 16 and 17 extend around and radially inwardly along the end walls to prevent excessive creeping of the matting in the side wall, and the foot structure joins the bottom wall of the tank at a circular zone that is concentric with the side wall, is of substantially smaller diameter than the side wall, and is spaced radially inwardly from the side wall a substantial distance S, as shown in FIGURE 14.

The above described examples of the invention may be varied without departing from the scope of the invention. For example, the central mold casing and the central portion of the tank need not necessarily be cylindrical, although generally a central portion of tubular shape is preferable. Similarly, the foot structure may be of an annular configuration other than cylindrical, as shown in FIGURE 15, or may comprise three or more individual feet spaced apart in an annular array, as shown in FIGURE 16. Other possible modifications of the details of the disclosed examples of the invention will suggest themselves. The invention is not limited to all the details of the illustrated examples but is defined by the following appended claims.

What is claimed is:

1. A fiber reinforced molded resin tank comprising a hollow body including a tubular center portion and end closure walls, said body comprising a cured resin distributed homogeneously throughout the body as a seamless monolithic mass and in permeating relationship with three unwoven fiber mats merging one into another and comprising first and second mats shaped to the form of and included in said end closure walls and a third mat shaped to the form of and included in said tubular center portion, said mats forming tapered lap seams along their regions of mergence, and the mat fibers from adjacent mats on opposite sides of said lap seams projecting across the seams in intermingled relationship so as to provide fiber reinforcement across said seams and render said seams substantially integral and indistinguishable, and the relative concentrations of resin and fiber being substantially uniform throughout said body so that it is free from relatively resin-rich, fiber-poor zones and from relatively fiber-rich, resin-poor zones.

2. A fiber reinforced molded resin tank according to claim 1 and additionally including a foot structure integrally connected to an end closure wall entirely within a circular zone thereon that is concentric with the cylindrical axis of the tank and of substantially smaller diameter, said foot structure comprising unwoven fiber matting permeated with said cured resin, and said cured resin extending homogeneously as a seamless monolithic mass from said hollow body into and throughout said foot structure.

3. A fiber reinforced molded resin tank according to claim 1 in which each of said unwoven fiber mats comprises an outer layer of glass fibers lined on its inner side with fibers of a different chemical composition, the transition from one kind of fiber to the other being a gradual one with the fibers of the two types intermingled in the transition zone.

4. A fiber reinforced, molded resin tank body comprising side and end walls defining a substantially closed hollow structure and consisting of cured resin distributed homogeneously throughout the body as a seamless monolithic mass and in permeating relationship with a continuous reinforcement of unwoven fiber matting shaped to the form of the container and included therein, said matting and resin being substantially uniformly distributed throughout the body so that it is free from relatively resin-rich, fiber-poor zones and from relatively fiber-rich, resin-poor zones, and said matting comprising an outer layer of glass fibers lined on its inner side with fibers of a different chemical composition, the transition from one kind of fiber to the other being a gradual one with the fibers of the two types intermingled in a transition zone.

5. A fiber reinforced molded resin tank comprising a hollow body including a tubular center portion and end closure walls, said body comprising a cured resin distributed homogeneously throughout the body as a seamless monolithic mass and in permeating relationship with a continuous reinforcement of unwoven fiber matting shaped to the form of the container and included therein, said matting and resin being substantially uniformly distributed throughout the body of the container so that it is free from relatively resin-rich, fiber-poor zones and from relatively fiber-rich, resin-poor zones, said matting including, in at least one location adjacent its inner surface, a plurality of substantially concentric, superimposed, contiguous plies of mat fibers of progressively diminishing surface areas, the fibers of adjacent plies projecting across the seams therebetween in intermingled relationship so as to provide fiber reinforcement across said seams and maintain continuity of fiber reinforcement across said seams in the resulting fiber reinforced resin structure, the superimposed plies of mat fibers permeated with said resin providing an integral, seamless, thickened tank wall portion that increases in thickness from its periphery toward its center.

6. A hollow, porous, tank form consisting entirely of matted, unwoven, intermingled fibers and being permeable throughout by a settable liquid resin to produce a seamless, hollow, fiber reinforced, molded resin tank, comprising a tubular mat of said fibers and two separate concavo-convex mats of said fibers respectively partially telescoped with the ends of said tubular mat and in overlapping engagement therewith so as to define said hollow structure, the mats being overlapped along tapered lap seams therebetween to provide only gradual variations in thickness of the form in the regions of overlap and the fibers of said mats projecting into intermingled relationship with the fibers of the adjacent forms over the areas of overlap thereof one with another, whereby the assembled hollow fibrous structure is free from fiber discontinuities and is permeable throughout for receiving a settable liquid resin to produce a seamless monolithic mass of said resin filling all interstices between the fibers throughout said structure.

7. A porous form of fibers according to claim 6 and having, at least in one location adjacent the inner surface thereof, a plurality of substantially concentric superimposed plies of said matted fibers of progressively diminishing surface areas with the fibers of adjacent plies projecting across the seams therebetween in intermingled relationship so as to maintain continuity of fiber reinforcement throughout a thickened wall portion of the form that increases in thickness from its periphery toward its center.

References Cited in the file of this patent

UNITED STATES PATENTS

| | | |
|---|---|---|
| 2,280,501 | Stephenson | Apr. 21, 1942 |
| 2,460,820 | Hagopian | Feb. 8, 1949 |
| 2,541,065 | Jabour | Feb. 13, 1951 |
| 2,690,256 | Shaw | Sept. 28, 1954 |
| 2,698,271 | Clark | Dec. 28, 1954 |
| 2,710,026 | Stewart et al. | June 7, 1955 |
| 2,718,583 | Noland et al. | Sept. 20, 1955 |
| 2,739,917 | Schulze | Mar. 27, 1956 |
| 2,744,043 | Ramberg | May 1, 1956 |
| 2,771,387 | Kleist et al. | Nov. 20, 1956 |
| 2,777,626 | French | Jan. 15, 1957 |
| 2,801,946 | Evenblij | Aug. 6, 1957 |
| 2,815,534 | Ising et al. | Dec. 10, 1957 |
| 2,915,425 | Biedebach | Dec. 1, 1959 |

FOREIGN PATENTS

| | | |
|---|---|---|
| 185,735 | Austria | Aug. 15, 1955 |
| 202,671 | Australia | Jan. 20, 1955 |